United States Patent [19]
Gravert

[11] 3,756,281
[45] Sept. 4, 1973

[54] EMERGENCY HAND PUMP CONNECTION FOR HYDRAULICALLY OPERATED VALVES

[75] Inventor: William H. Gravert, Port Washington, N.Y.

[73] Assignee: Marine Moisture Control Company, Inc., Inwood, L.I., N.Y.

[22] Filed: Dec. 27, 1971

[21] Appl. No.: 212,108

[52] U.S. Cl............................ 137/625.48, 251/339
[51] Int. Cl........................................... F16k 11/02
[58] Field of Search.................. 137/625.48, 625.43, 137/614.03, 614.04, 630.16; 251/291, 339

[56] References Cited
UNITED STATES PATENTS

| | | | |
|---|---|---|---|
| 3,213,884 | 10/1965 | Moyer et al. | 137/625.48 X |
| 3,280,834 | 10/1966 | Zahuranec | 137/613 X |
| 3,049,148 | 8/1962 | Richardson | 137/614.04 X |
| 3,311,130 | 3/1962 | Caldwell | 137/597 X |
| 3,426,799 | 2/1969 | Kintner | 137/625.48 |
| 3,446,245 | 5/1969 | Snyder, Jr. | 137/614.03 |
| 3,574,314 | 4/1971 | Quercia | 137/613 X |
| 3,633,618 | 1/1972 | Blackmore et al. | 137/597 |

Primary Examiner—Samuel Scott
Attorney—Max L. Libman

[57] ABSTRACT

The building of large super tankers for the transportation of liquid cargoes has made it necessary to use hydraulically operated valves to handle the cargo. Hydraulic oil, under pressure, needed to power the valves, is run to each valve using small diameter piping. In times of emergency, when the hydraulic tubing is damaged, a portable hand pump, complete with its oil reservoir, is provided. The pump is carried as close to the hydraulically operated valve as possible and suitable connections must be made to direct the hydraulic oil pressure generated in the emergency hand pump to the valve actuator. A fitting or connection is disclosed herein by means of which the hand pump can be connected to the desired hydraulically operated valve, and which automatically shuts off at least the up-stream side of the hydraulic line so that the hand pump now can manually operate the valve independently of the damaged hydraulic pressure system, until repairs can be made.

2 Claims, 6 Drawing Figures

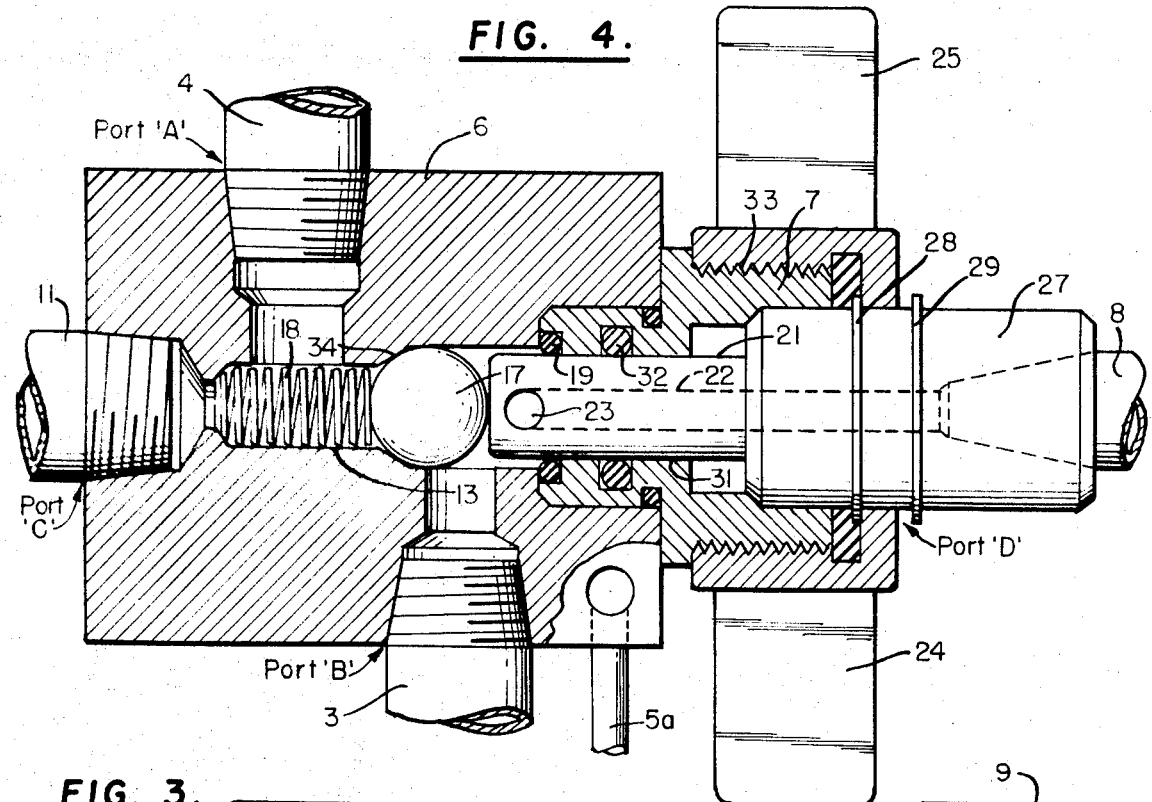
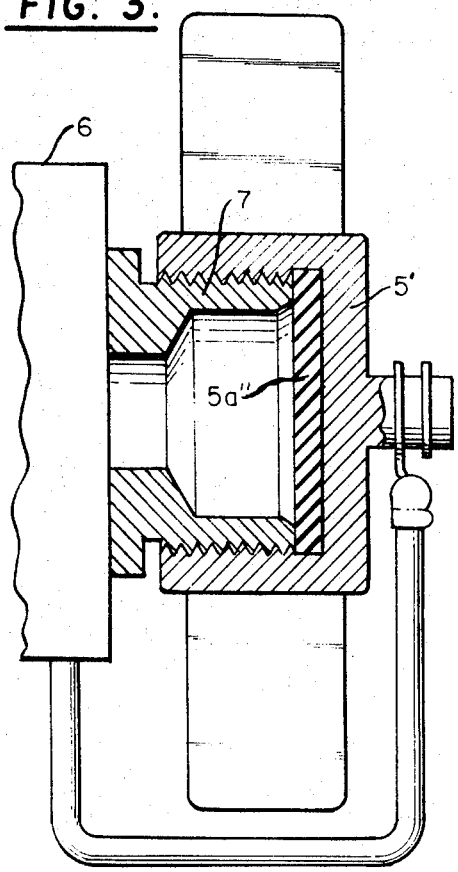
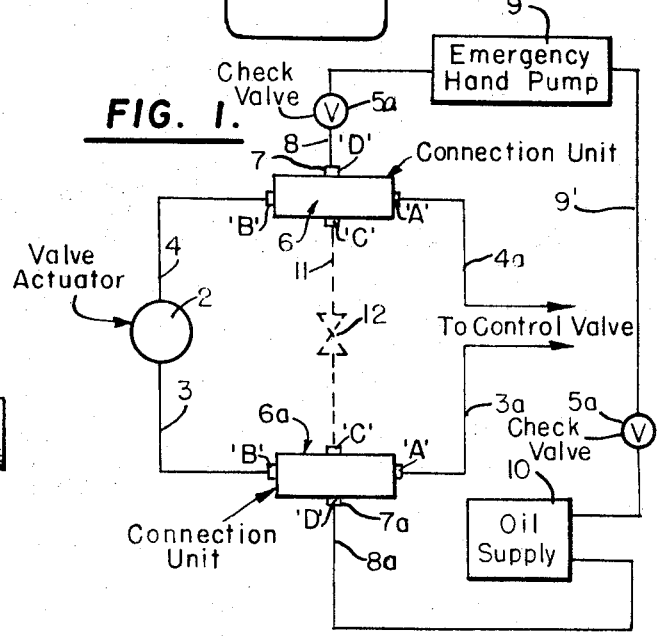
INVENTOR
William H. Gravert
BY Max L. Libman
ATTORNEY

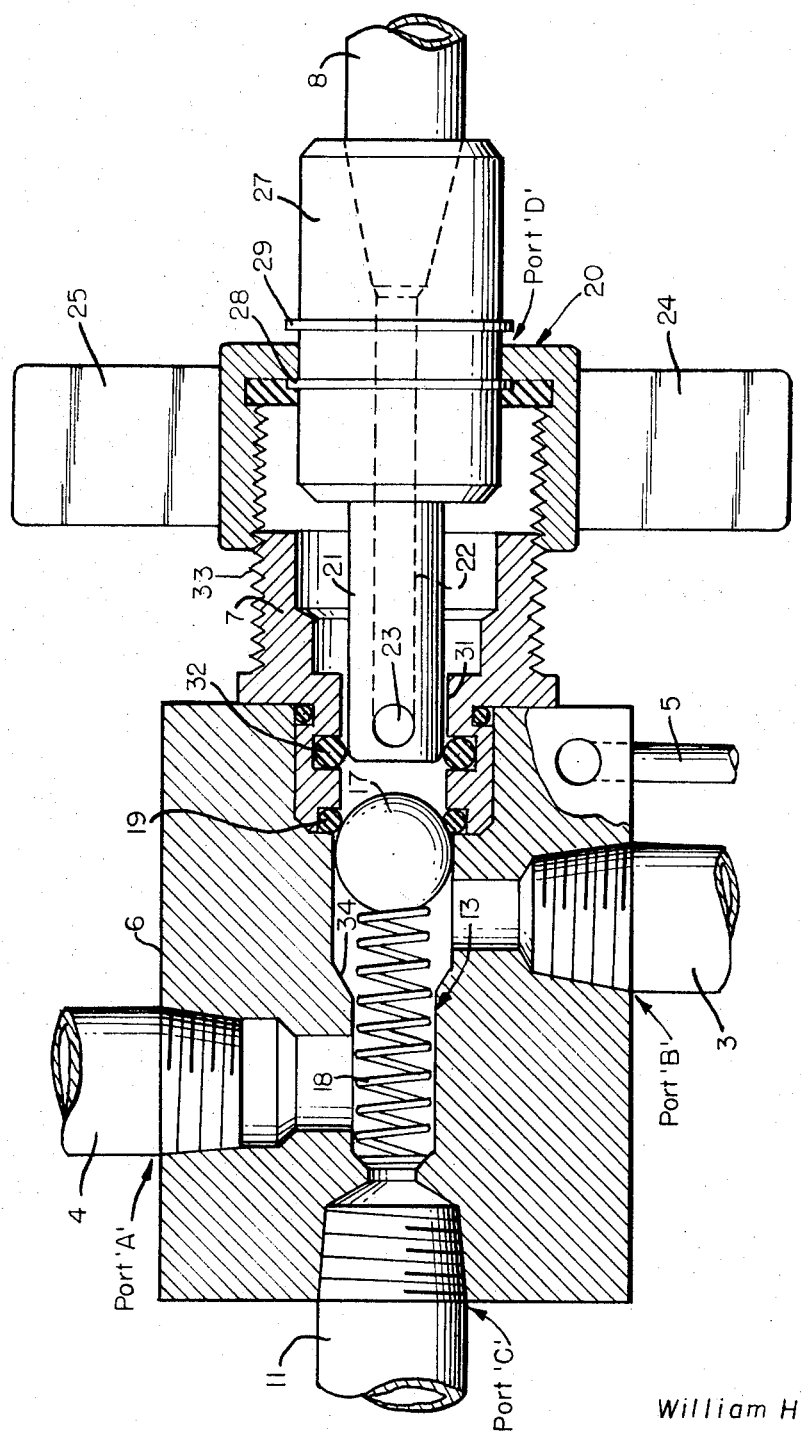

INVENTOR
William H. Gravert

BY Max L. Libman
ATTORNEY

EMERGENCY HAND PUMP CONNECTION FOR HYDRAULICALLY OPERATED VALVES

A modern 250,000 ton tanker will use over 15 miles of hydraulic piping to connect many hydraulically operated valves to a central control console, thereby permitting rapid and efficient operation of the tanker with minimum manpower. However, with such a large amount of piping, it can easily happen that at least a portion of the system will become inoperatibe due to damage to the piping, at which time it becomes absolutely essential to provide some independent manual means for operating the hydraulic actuators on an emergency basis, until the damage can be repaired. In order to accomplish this, some form of self-sealing coupling must be used which will isolte the valve actuator from the normal hydraulic system, and enable the emergency hand pump to be connected to the valve actuator independently of the normal system, so that manual operation becomes possible. The present invention provides a self-sealing coupling for the above purpose, which has the feature of automatically shutting off at least the up-stream side when the hand pump connection is made, without any further thought on the part of the operator, and without requiring him to remember to shut and open a number of valves in a certain sequence, which is often difficult to remember during an emergency. It should be kept in mind, that in an emergency situation of the above type, it is the up-stream side which has to be shut off, as damage on the down-stream side of the piping system will usually not incapacitate the valve actuators, also, the up-stream side is usually on deck and is more exposed, while the valves in the tanks are in a sheltered location, so that in practice, it is the up-stream side which has the damage and must be sealed off in order to enable use of the emergency hand pump.

The specific nature of the invention, as well as other objects and advsntages thereof, will clearly appear from a description of a preferred embodiment as shown in the accompanying drawings in which:

FIG. 1 is a general schematic drawing of a hydraulic layout system including the portion relevant to the present invention;

FIG. 2 is a longitudinal sectional view through the unit as the hand pump fitting is beginning to be applied;

FIG. 3 shows the end of the unit in its normal condition with the emergency hand pump connection sealed off by a closure cap;

FIG. 4 is a view similar to FIG. 2 but with the hand pump fitting completely connected and the normal pressure line shut off;

Figure 5:
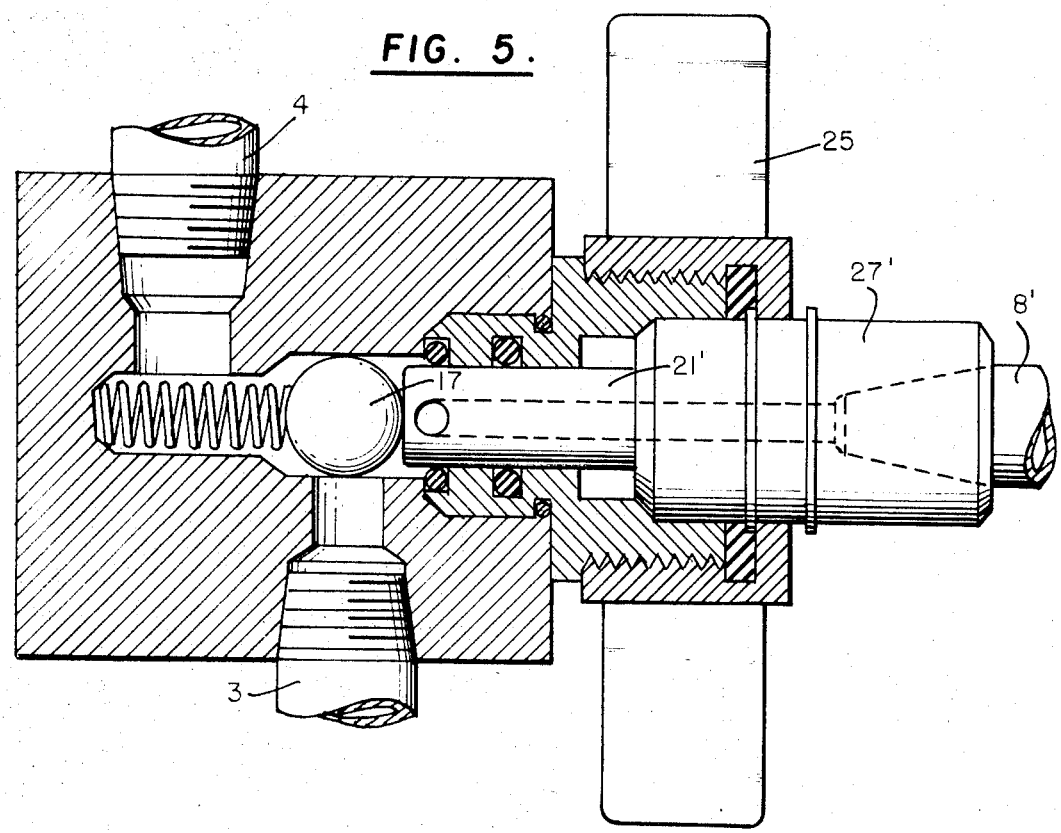
FIG. 5 is a similar view of a modified form of the device.

Referring to FIG. 1, the valve actuator 2 is supplied with hydraulic fluid under pressure in lines 3 and 4 which are respectively connected to lines 3a, 4a which typically lead to a remotely controlled valve by means of which an operator at a central control console can supply pressure fluid to the tubes 3 and 4 to the actuator 2 in either direction, to control opening and shutting of the valve. This valve actuator is a hydraulic fluid motor which controls the operation of the large valves which in turn control the loading and discharging of oil from the tanker. Inserted in each of the lines 3 and 4 is an emergency connection unit 6 and 6a, which are identical units and will be described in detail below. Each unit has a pipe fitting 7, 7a by means of which it can be connected to an external line 8, 8a, which in turn can be connected to an emergency hand pump 9 when the pressure in line 3a, 4a fails for any reason, necessitating the manual control of the valve actuator 2. The emergency hand pump 9 will be connected to either unit 6 or 6a depending on which one is in the upstream side. Probe assembly 27 (FIG. 2) attached to the end of a short flexible pipeline 8, is inserted at 7, and a similar unit attached to the end of a short flexible line 8a is inserted at 7a, thus blocking off normal pressure lines 3a and 4a, as will be shown below. When hand pump 9 is operated, it forces oil into the actuator 2 via line 4, and as the actuator moves, existing oil in the actuator leaves via line 3 and is returned to the tank 10, which is a local oil supply of perhaps 5 gallons, attached to the emergency hand pump by line 9', through a one-way check valve 5a. Reverse operation is accomplished by connecting line 8 to fitting 7a and line 8a to fitting 7 respectively, thus reversing the direction of the oil flow when the hand pump is operated. In practice, the fittings are usually color-coded to make operation easier. A further connection may be made through the emergency unit as indicated by dotted line 11 and valve 12, which is normally closed, but the valve 12 may be opened when desired to provide a bypass for filling or flushing the system.

FIG. 3 shows the emergency connection in its normal state, with a screw cap 5' sealing the fitting 7.

FIG. 2 shows the emergency connection unit with the cap 5' removed and the emergency fitting substituted therefor, at the beginning of the operation. The unit 6 has a main or first passage way 13 interconnecting ports A and B, which are threaded to take any suitable pipe fitting so that they may be connected respectively to lines 4a and 4 or 3a and 3 in FIg. 1. Port C is for the connection of line 11, while port D is preferably provided with an externally threaded fitting 7 which is normally closed by screw cap 5' preferably provided with a sealing pad 5a''. Since port C is normally closed by valve 12 of FIG. 1, this port can be disregarded, as the normal operation is the same as if this port were not present. A ball valve 17 is urged by spring 18 against valve seat 19, which may be in the form of a neoprene ring to insure a good seal, although any other type of spring-biased valve and seal may be employed. Thus, even if cap 5' (FIG. 3) is removed, port D will still be effectively sealed from the pressure part of the system by the ball valve 17. However, in the case of an emergency, if either line 3a or 4a has broken or lost pressure, it becomes necessary to establish manual control of the valve actuator 2, which can be done by connecting the emergency hand pump 9 to port D. This can be done by first unscrewing the cap 5', and replacing it with emergency connection 27, which has an elongated tubular probe 21 provided with a longitudinal bore as shown at 22, connected to a transverse bore 23 at the inner end of the probe. The outer end of the probe contains a pipe fitting, of any suitable type, to which flex hose 8 may be connected, which in turn is connected to the emergency hand pump9. A nut 24, preferably provided with handles 25 to obviate the need for a separate nut wrench, is fixed to the enlarged body 27 of the probe so that it can rotate thereon, being restrained against axial movement by collars 28 and 29. When the probe is inserted into passageway 31, into which it loosely but fairly closely fits, it first engages ring seal 32, which may be a neoprene O-ring just as the threads 33 of the nut 24 begin to engage the threads on fitting 7. At this time, the free ball valve 17 is still seated at 19, and there is therefore no pressure opposing the inward motion of the probe. As the nut is tightened, and the probe continues to advance, its end shortly engages the ball valve 17, and forces it off its seat to the left against the action of spring 18, until, when the nut is fully tightened down, the ball valve is seated against valve seat 34 as shown in FIG. 4, thus shutting off port A from port B while opening the passage way between port B and port D. It will now be apparent that when the emergency hand pump is operated to provide pressure in pipe 8, this pressure will be transmitted to port B, and therefore to pipe 3 and to the valve actuator so that the valve can be operated as required.

It will be noted that with the above construction, the probe can be inserted and the above-described connection made even though there is pressure in the normal hydraulic system, thus enabling individual manual operation of any selected valve actuator whenever it is desired.

Figure 6:
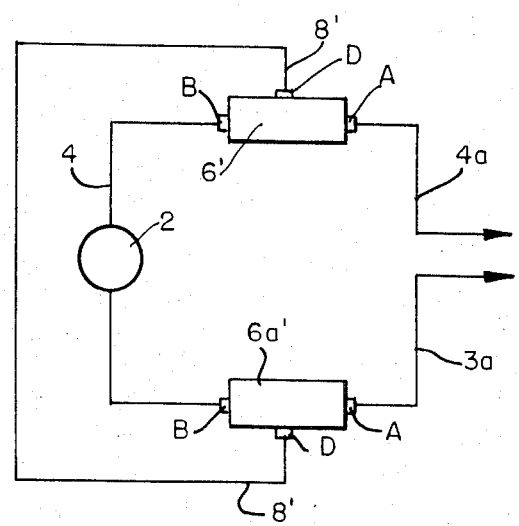
FIG. 6 is a schematic drawing similar to FIG. 1 showing how the modification of FIG. 5 is used.

FIGS. 5 and 6 show a modified form of the invention, which enables the elimination of port C and valve 12. For this purpose, a special flexible hose 8' with modified probe 27' on each end is used between ports D of the two fittings. The connection is made as shown in FIG. 6. The modified probe has port 21' slightly shorter than port 21 of the previous Figures, so that when it is inserted ball 17 is not seated against valve 34, but rests in the mid position in its passageway so that it allows flow around it between ports A, B, and D, thus establishing a flow path similar to that obtained by opening valve 12 in the modification of the previous Figures. This connection is used for system filling, flushing and air removal, in the same manner as was valve 12 in the previous Figures.

I claim:

1. a. An emergency fitting for a hydraulic pressure system, for enabling a valve actuator in the system to be operated manually by a local source of hydraulic pressure such as an emergency hand pump, b. said fitting having a normally open first fluid passageway between the normal source of hydraulic pressure and said valve actuator, c. said fitting having a second passageway between said first passageway and an external threaded pipe coupling, d. a movable valve normally biased to rest against a valve seat and closing the other end of said second passageway to prevent the passage of fluid from the hydraulic pressure system to said second passageway, e. an emergency probe having a third fluid passageway extending longitudinally thereof and having a fitting at one end of said passageway for connection to an emergency hand pump, said probe being of a size to fit into said second passageway, f. a threaded element mounted on said probe and engagable with said external pipe fitting when said probe is fitted into said second passageway so that the end of the probe engages said movable valve to move it from its seat to open the end of the second passageway to provide fluid access to said first passageway, g. said threaded element being sufficiently long so that further threading engagement thereof on said external pipe fitting causes said valve to close the first passageway to said normal source of hydraulic pressure, whereby said third passageway is connected to said valve actuator and said normal source of hydraulic pressure is closed off, h. and an alternate probe similar to said emergency probe but sufficiently shorter in length so that it opens the end of the second passageway but does not close the first passageway to the normal source of pressure, so that all passageways are interconnected.

2. a. An emergency fitting for a hydraulic pressure system, for enabling a valve actuator in the system to be operated manually by a local source of hydraulic pressure such as an emergency hand pump, b. said fitting having a normally open first fluid passageway between the normal source of hydraulic pressure and said valve actuator, c. said ftting having a second passageway between said first passageway and an external threaded pipe coupling, d. a ball valve movable along said first passageway and normally spring-biased in a first position to rest against a valve seat to close the end of said second passageway where it joins the first passageway to prevent the passage of fluid from the hydraulic pressure system to said second passageway, e. an emergency probe having a third fluid passageway extending longitudinally thereof and having a fitting at one end of said passageway for connection to an emergency hand pump, said probe being of a size to fit into said second passageway, f. a threaded element mounted on said probe and engagable with said external pipe fitting when said probe is fitted into said second passageway so that the end of the probe engages said ball valve to move it from its seat to open the end of the second passageway to provide fluid access to said first passageway, g. and a second valve seat in said first passageway closable by said ball valve in a second position of said ball valve to close said first passageway from said normal source of hydraulic pressure, h. said threaded element being sufficiently long so that on further threaded engagement thereof on said external pipe fitting said probe moves said ball valve against its spring bias into engagement with said second valve seat to close the first passageway to said normal source of hydraulic pressure, whereby said third passageway is connected to said valve actuator and said normal source of hydraulic pressure is closed off.

* * * * *